United States Patent
Strenski et al.

(10) Patent No.: US 11,847,436 B2
(45) Date of Patent: Dec. 19, 2023

(54) MACHINE LEARNING (ML) MODEL-BASED COMPILER

(71) Applicant: HEWLETT PACKARD ENTERPRISE DEVELOPMENT LP, Houston, TX (US)

(72) Inventors: David Strenski, Ypsilanti, MI (US); Sreenivas Rangan Sukumar, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/583,987

(22) Filed: Jan. 25, 2022

(65) Prior Publication Data
US 2023/0236813 A1    Jul. 27, 2023

(51) Int. Cl.
*G06F 8/51* (2018.01)
*G06F 8/41* (2018.01)
*G06F 8/53* (2018.01)

(52) U.S. Cl.
CPC ............. *G06F 8/51* (2013.01); *G06F 8/41* (2013.01); *G06F 8/53* (2013.01)

(58) Field of Classification Search
CPC ............... G06F 8/53; G06F 8/41; G06F 8/51
See application file for complete search history.

(56) References Cited

U.S. PATENT DOCUMENTS

| | | | | |
|---|---|---|---|---|
| 2015/0094891 | A1* | 4/2015 | Weber | G06F 11/368 |
| | | | | 429/7 |
| 2015/0135166 | A1* | 5/2015 | Tarlow | G06F 11/3604 |
| | | | | 717/124 |
| 2018/0150742 | A1* | 5/2018 | Woulfe | G06F 11/3608 |
| 2019/0228319 | A1* | 7/2019 | Gupta | G06N 5/04 |
| 2021/0011694 | A1* | 1/2021 | Ni | G06F 8/53 |
| 2021/0081837 | A1* | 3/2021 | Polleri | G06N 5/022 |
| 2021/0081841 | A1* | 3/2021 | Sikka | G06N 3/105 |
| 2021/0081848 | A1* | 3/2021 | Polleri | G06F 16/9035 |
| 2021/0132915 | A1* | 5/2021 | Ivankovic | G06N 20/00 |
| 2021/0133620 | A1* | 5/2021 | Frank | G06F 8/35 |

(Continued)

FOREIGN PATENT DOCUMENTS

CN    112905188 A    6/2021

OTHER PUBLICATIONS

"Performance and Algorithms Research, U.S. Department of Energy," https://crd.lbl.gov/divisions/amcr/computer-science-amcr/par/research/, Feb. 25, 2022, pp. 2.

(Continued)

*Primary Examiner* — Phillip H Nguyen
(74) *Attorney, Agent, or Firm* — Sheppard Mullin Richter & Hampton LLP

(57) ABSTRACT

Systems and methods are provided for implementing a machine learning (ML) model based compiler, language translator, and/or a decompiler. For example, the system may receive a first source code in a first programming language, tokenize the first source code file forming tokenized code, generate a sequence vector of tokenized code, and provide the sequence vector of tokenized code as input to a trained ML model compiler. The output of the trained ML model compiler may create a second executable file or the source code in a second programming language.

20 Claims, 14 Drawing Sheets

(56) References Cited

U.S. PATENT DOCUMENTS

2021/0398015 A1* 12/2021 Fogal .................. G06N 20/00
2022/0083450 A1* 3/2022 Geddes ................ G06F 8/70
2022/0308848 A1* 9/2022 Clement ............... G06F 8/51
2023/0040412 A1* 2/2023 Ramsl ................. G06F 8/51

OTHER PUBLICATIONS

Katz, O., et., "Towards Neural Decompilation," arXiv preprint arXiv:1905.08325, May 20, 2019.
Kaufmann, S., "CrayPat—Cray X1 Performance Analysis Tool," CRAY User Group, May 14, 2003, pp. 1-32.
Levy, D., et al., "Learning to Align the Source Code to the Compiled Object Code", Proceedings of Machine Learning Research, vol. 70, Aug. 6, 2017, pp. 2043-2051.
NVIDIA, Profiler User's Guide, https://docs.nvidia.com/cuda/profiler-users-guide/index.html, Feb. 22, 2022, pp. 150.
Roziere, B., et al., "Deep Learning to Translate Between Programming Languages," Facebook AI, Jul. 21, 2020, pp. 10.
Serebryakov, S., et al., "Deep Learning Cookbook: Recipes for your AI Infrastructure and Applications," IEEE International Conference on Rebooting, Nov. 28, 2019.
Stackoverflow, "Artificial Neural Network Used to Compile Source Code," Mar. 13, 2011, pp. 3.
Sze, V., et al., "How to Evaluate Deep Neural Network Processors: TOPS/W (Alone) Considered Harmful," vol. 12, Issue 3, Aug. 25, 2020, pp. 28-41.

\* cited by examiner

MACHINE LEARNING (ML) MODEL-BASED COMPILER

BACKGROUND

Computer programmers create source code (e.g., human readable instructions) to perform actions on a computing device (e.g., multiply two matrices of numbers, sort data in ascending or descending order, tag people in images, recognize faces, etc.). The source code is then compiled into a binary file that contains machine instructions (e.g., executable code) that are execute on local hardware (e.g., the computing device) or transmitted to run on distributed hardware. The source code can also be debugged while being executed on the hardware.

In practice, source code that is compiled into executable code can be implemented using different programming languages (e.g., C, FORTRAN, Python, C++, Java, Scala, etc.) and executed on different kinds of hardware (e.g., CPUs, GPUs, FPGAs, etc.). Many thousands of person-hours and multiple levels of expertise in computer programming, cross-compiling, code optimization, and code porting are required to manually enable the executable code for different computing environments and devices, causing inefficiency and delay.

A compiler is an executable program that converts source code, written in a particular programming language, into a machine executable file. Modern compilers are a large collation of logic that systematically analyzes the syntaxes of the programming language, all the variables and dependences within the source code and generates hardware instructions to perform those actions of the source code on a particular computing device. Compilers are complex machine executables that are created with a tremendous amount of work in order to generate these executable files for computing devices, and are usually limited to compiling for a single programming language.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
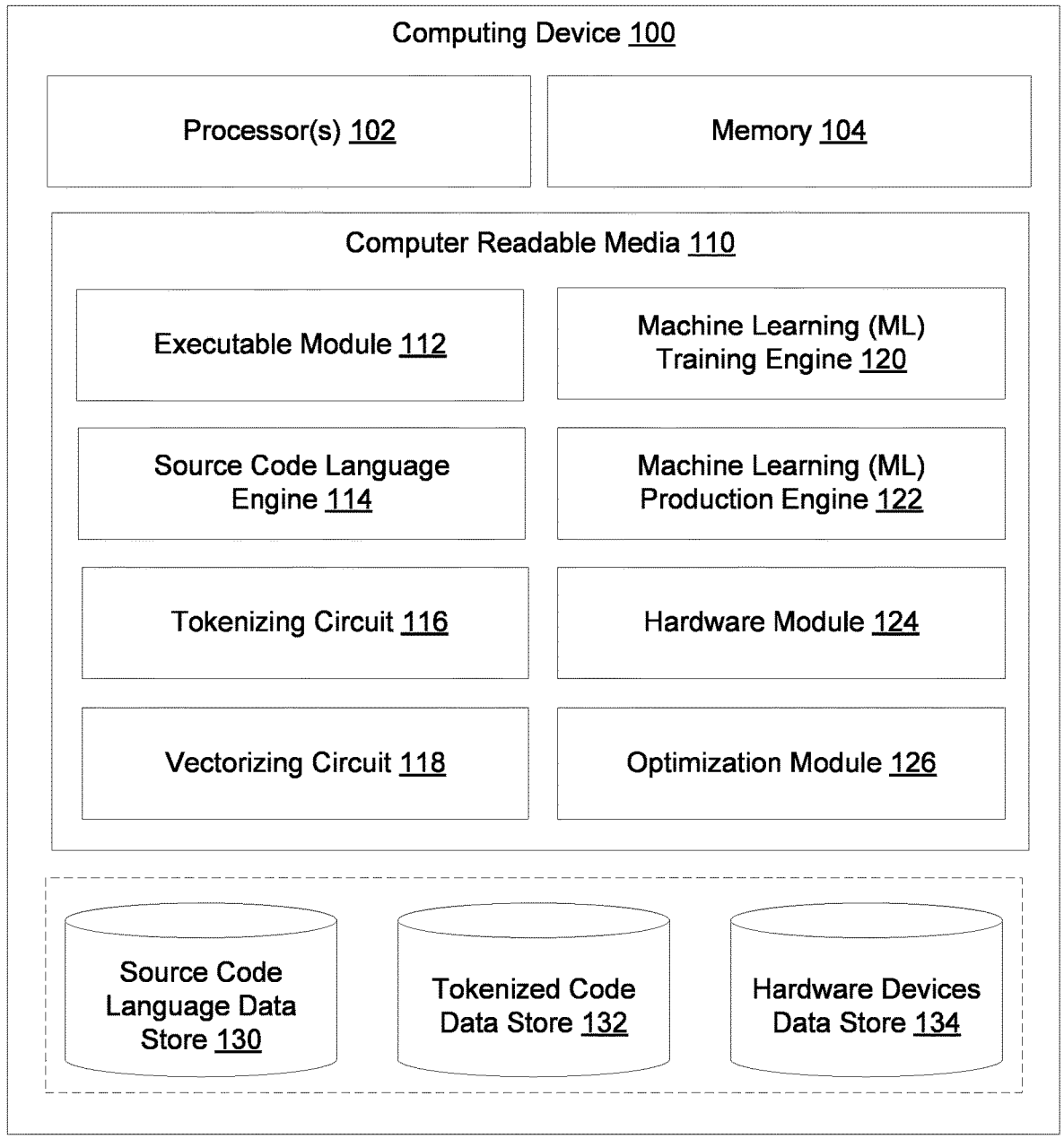
FIG. 1 illustrates a computing device for implementing a ML model-based compiler, in accordance with some examples of the disclosure.

The figures are not exhaustive and do not limit the present disclosure to the precise form disclosed.

DETAILED DESCRIPTION

As described herein, a standard, native, or local compiler (used interchangeably throughout) implemented on a computer device is an executable program that converts source code, written in a particular programming language, into a machine executable file. The local compiler may create the executable code to run on the same, local computing device or on a another, remote, computing device. Good compilers not only generate an executable file that executes the code correctly, but also attempt to execute the source code efficiently, minimal amount of time, for the corresponding hardware that is running the code.

Examples described herein implement a machine learning (ML) model-based compiler to improve, or replace, the local compiler. For example, instead of providing source code to a local compiler to generate an executable file comprising machine executable code, a trained ML model is used to perform the operations of the local compiler and improve on it. The ML model-based compiler may be trained to operate as a local compiler or configured to run as a cross compiler that converts the source code or compiled, executable code to source code written in different programming languages or executable code that is configured to execute on different machines.

The ML model-based compiler can be trained to run in place of the local compiler. For example, the ML model-based compiler may convert source code in a first language to source code in a second language, convert source code into compiled, executable code (or vice versa to convert compiled, executable code back into source code) where the executable code runs on a first device or a second device, convert first compiled, executable code for a first device into second compiled, executable code for a second device, or convert compiled, executable code to run on a first device or second device.

To create the ML model-based compiler, the ML model-based compiler may be trained to perform the actions of the local compiler using a different process. For example, the ML model-based compiler may be trained using a large set of sample source code in order to learn to convert the source code into corresponding executable files (e.g., rather than compiling it). The ML model-based compiler can do the training with the executable code in a first numerical format (e.g., binary, hexadecimal, octal, or other numerical formats) that can be converted into a different numerical format. This leads to a large set of pairs of text, including an input text as source code and output text as the corresponding executable file in the numerical format. Having a large set of these pairs, the ML model-based compiler can be trained to generate the output text from a given input text (e.g., like translating from French to Spanish).

To start the training of the ML model-based compiler, simplified source code may be provided to help train the ML model on a few initial features, like the classic "hello world"

code. As the ML model gets "smarter" (e.g., by learning patterns and weights corresponding with the training process), the training process can add more features that are longer or more complex. For example, the second phase of the training process may assign a string of text to a variable and print the contents of that variable to a display of the computing device dedicated to producing output, instead of printing the string of text directly to a terminal of the computing device (e.g., printf ("Hello world\n") vs. char var[12]="Hello world"; printf ("% s\n", var)).

Later iterations of the training process may add more complexity in the source code, like various programming language features or other examples found in open source code. For example, the programming language features may include comment lines, line breaks, assignment statements, declarations, algorithmic loops, case statements, if/then/else statements, and other multi-iteration instructions. The various programming language features may be added until all features of a standard compiler (e.g., a native or local compiler to the computing device) are represented in the training code samples of the ML model-based compiler. Each of the sample source code instructions may have a corresponding numerical format that represents the executable code.

Once the ML model-based compiler is trained using various programming language features, the ML model may be optimized for speed of execution. For example, source code text may be provided to other, pre-determined, native, local compilers from different sources (e.g., Intel®, AMD®, GNU, or Cray®) to generate input and output pairs of text. Each of these different compilers may generate a different executables file, which originate from different instruction set architectures (ISAs) corresponding with each hardware device. The large set of pairs of text may be provided to the ML model-based compiler for additional training. Once complete, the ML model may perform the functions of a compiler that is optimized using various native or local compilers and may also find optimization that does not currently exist in any of the native or local compilers learned through the training process.

Various technical benefits exist, including generating a ML model-based compiler to (1) act as a source code translator that can port source code from a first language to a second language, (2) provide performance-as-a-service (e.g., without source code changes) where the ML model generated executable file can run on any computing device type (e.g., chosen for optimal performance or availability), (3) recommend performance optimized source and executable code, and (4) provide a way to decompile a machine numerical format back into source code.

FIG. 1 illustrates a computing device for implementing a ML model-based compiler, in accordance with some examples of the disclosure. In computing device 100, processor 102, memory 104, and computer readable media 110 are provided.

Processor 102 may be one or more central processing units (CPUs), semiconductor-based microprocessors, and/or other hardware devices suitable for retrieval and execution of instructions stored in computer readable media 110. Processor 102 may fetch, decode, and execute instructions to control processes or operations for creating and implementing the ML model-based compiler. As an alternative or in addition to retrieving and executing instructions, processor 102 may include one or more electronic circuits that include electronic components for performing the functionality of one or more instructions, such as a graphics processor unit (GPU), field programmable gate array (FPGA), application specific integrated circuit (ASIC), or other electronic circuits.

Memory 104 may include a random access memory (RAM), cache, and/or other dynamic storage devices for storing information and instructions to be executed by processor 102. Memory 104 also may be used for storing temporary variables or other intermediate information during execution of instructions to be executed by processor 102. Such instructions, when stored in computer readable media 110 accessible to processor 102, rendering computing device 100 into a special-purpose machine that is customized to perform the operations specified in the instructions.

Memory 104 may include a read only memory (ROM) or other static storage device for storing static information and instructions for processor 102. Memory 104 may include a magnetic disk, optical disk, solid state disk (SSD), Non Volatile Memory Express (NVMe) or USB thumb drive (Flash drive), etc. for storing information and instructions. In some examples, the information and instructions may be stored in a plurality of data stores, including source code language data store 130, tokenized code data store 132, and hardware devices data store 134.

Computer readable media 110 may be any electronic, magnetic, optical, or other physical storage device that contains or stores executable instructions. Computer readable media 110 may be, for example, Random Access Memory (RAM), non-volatile RAM (NVRAM), an Electrically Erasable Programmable Read-Only Memory (EEPROM), a storage device, an optical disc, and the like. In some embodiments, computer readable media 110 may be a non-transitory storage medium, where the term "non-transitory" does not encompass transitory propagating signals. As described in detail below, computer readable media 110 may be encoded with executable instructions implemented with a plurality of modules, circuits, and engines, including executable module 112, source code language engine 114, tokenizing circuit 116, vectorizing circuit 118, machine learning training engine 120, machine learning production engine 122, hardware module 124, and optimization module 126.

Executable module 112 may include a first compiler (e.g., a local compiler to computing device 100) that receives source code generated by a computer programmer operating the computing device 100, compiles it, and builds an executable file that will run on hardware corresponding with computing device 100. In this example, the source code and executable code may be self-contained and/or native at computing device 100 without involving a local computer with a local compiler tuned to a particular programming language or hardware.

Executable module 112 may also implement a cross compiler to generate an executable file for the local device or a remote device like a second computing device. For example, executable module 112 may receive source code from a local computer. The local computer may include a compiler (e.g., a local compiler to the local computer) and generate an executable for a second computer. The compiler may receive the source code generated by a computer programmer and compile it locally to generate the first executable file that will run on hardware corresponding with the local computer. The first executable file may be transmitted to computing device 100 for analysis and processing, such that executable module 112 receives the first executable file that corresponds with the hardware of the local computer of the computer programmer.

In some examples, executable module 112 may receive an environment variable (e.g., a dynamic string transmitted during runtime operation of the program) that identifies the local machine or remote machine to receive the file in the numerical format. For example, executable module 112 may use the cross compiler feature to generate an executable file that will run on hardware corresponding with the remote computer. In some examples, executable module 112 may use the cross compiler feature to convert the first executable file that will run on hardware corresponding with the local computer back into source code (rather than the executable file) readable by a second computing device (e.g., in the original programming language or a different programming language from the native language used to compile the executable file) using a similar process.

Executable module 112 may also implement a cross compiler to receive source code readable by a second computing device. For example, executable module 112 may receive source code in a first programming language from a local computer. The local computer may include a second compiler (e.g., a local compiler to the local computer) that may also receive the source code generated by a computer programmer and may compile it locally to an executable file that will run on the local computer. The source code (in place of or in addition to the executable code) may be transmitted to computing device 100 for analysis and processing, such that executable module 112 receives the source code that corresponds with the first programming language from the local computer and uses the cross compiler feature to convert the source code from the first programming language to source code in a second programming language. The source code in the second programming language may be provided to a different compiler that can compile source code in that programming language (e.g., to generate a second executable file or to review and maintain the source code in the second programming language). As such, the local computing device is configured to compile the source code into an executable file comprising executable code that can implement machine-readable instructions locally at the local computing device and not necessarily at other computing devices. The second compiler may generate the executable file for the local computer.

In some examples, the executable file may correspond with a numerical set of instructions that are readable by the local computing device and instruct the local computing device to perform particular operations. When received, executable module 112 may identify information associated with the executable file. The information may include the hardware type of local computing device which may be provided as input with the executable file to train the ML model-based compiler.

Source code language engine 114 may receive source code corresponding with one or more executable files for training the ML model-based compiler and may be stored in source code language data store 130. The source code may include simplified source code on a few initial features, like the classic "hello world" code. For example, the "hello world" code in the C language may include:

```
#include <stdio.h>
int main ( )
{
    printf ("Hello world\n")
    return 0;
}
```

The program can print "Hello world" on the local computing device terminal, including a newline character (e.g., corresponding with \n).

The "hello world" code may be received in additional computer languages as well and print a similar text string on the local computing device terminal. For example, in the Python language, the source code may include:

print("Hello world")

In another example, in the C++ language, the source could may include:

```
#include <iostream>
int main( ) {
    std::cout << "Hello World";
    return 0;
}
```

In another example, in the Fortran language, source code may include:

```
program hello
print *, "Hello world"
end program hello
```

Other source code examples may be received by source code language engine 114 and stored with source code language data store 130. The programming languages and example source code provided herein are for illustrative purposes and should not be limiting to the disclosure.

Source code language engine 114 may generate source code locally at computing device 100. For example, source code language engine 114 may generate a set of scripts that can randomly add or subtract source code language features to use for training purposes. As an illustrative example, a script may create a set of sample codes that only change the printed output to the display or terminal. This can help create multiple different sets of source code to further train the ML model-based compiler. The output executable code may be generated by compiling the source code (e.g., using the local compiler). The executable code may be converted to the numerical format to generate a set of inputs to the trained ML model (e.g., input is the source code and output is the numerical format corresponding with the executable code). This process can help build a large set of training data without relying on a different computing device to send the source code examples for training.

Source code language engine 114 may also receive (or generate) additional source code examples that are longer or more complex than the "hello world" code. For example, the additional source code may include assigning one or more characters to a variable and printing the output to a computing device display dedicated to producing the output, instead printing the one or more characters directly with the local device terminal. In some examples, the additional source code examples may add more complexity in the source code, like more complex features in each of the programming languages. For example, the features may include comment lines, line breaks, assignment statements, declarations, algorithmic loops, case statements, if/then/else statements, carriage returns, printing the string directly or via a character variable, and other multi-iteration instructions.

The programming language features may be added to the training process (e.g., implemented by ML training engine 120) until all features of a standard compiler are represented in the training code samples. Each of the sample source code instructions may have a corresponding numerical format (e.g., hexadecimal) that represents the executable code. Once this second phase is complete, the ML model-based compiler should be able to compile various "hello world" programs in multiple source code languages and generate executable files for multiple types of hardware.

In some examples, the source code generation performed by source code language engine 114 may start with a single, standard compiler (e.g., to make the training process less resource intensive and quicker), but may be expanded to use all possible standard compilers available that convert source code in one language to executable code in a numerical format. In this way, the ML model-based compiler may be exposed to multiple methods of generating an executable file.

Source code language engine 114 may also be configured to detect or identify errors in the source code. For example, when a character is missing from an instruction statement (e.g., ";" or "}"), source code language engine 114 may identify that the character is missing and as with a standard compiler would not be able to generate an executable file without generating an error. The ML model-based compiler may be trained to identify these types of errors in the source code and determine that the compiled, executable code would not be generated (e.g., at ML training engine 120), but rather an error code would be generated.

Tokenizing circuit 116 may be configured to break down or decode the source code or executable files into tokens that correspond with individual instructions or sets of characters (e.g., during the training process). In some examples, tokenizing circuit 116 may implement a machine-implemented process, algorithm, or design flow. The tokenized code may be a string of text, array of vector data, or other data structure format that represents a computer-implemented instruction in a corresponding language. Each tokenized code, intended output (e.g., the executable code for that specific source code instruction), and its corresponding language may be stored in tokenized code data store 132. In some examples, the tokenized code may correspond with various numerical formats.

The tokenized code may correspond with various conversion formats of the ML model-based compiler. For example, when the ML model-based compiler may be configured to convert source code from a first language or format to a second language or format, the tokens may correspond with a string or vector of characters in the first language, the equivalent string or string or vector of characters in the second language, and an identification of the two languages. In another example, when the ML model based compiler may be configured to convert source code to run on a first device or second device, the tokens may correspond with a string or vector of characters in the source code, the compiled, executable code in a numerical format that are instructions to run on the first device, and the compiled, executable code that are instructions to run on the second device. In another example, when the ML model-based compiler may be configured to convert source code into compiled, executable code (or vice versa, where the ML model-based compiler is converting compiled, executable code back into source code), the tokens may correspond with a string or vector of characters in the source code, the compiled, executable code in a numerical format that are instructions to run on the first device, and an identification of the source code and device to execute the corresponding compiled code. In another example, when the ML model-based compiler may be configured to convert compiled, executable code to run on a first device or second device, the tokens may correspond with a string or vector of characters in the compiled, executable code in a numerical format that are instructions to run on the first device and the compiled, executable code that are instructions to run on the second device.

Tokenizing circuit 116 may be configured to convert tokens from a first language to tokens in a second language using a state vector. For example, each token may correspond with an instruction set architecture for performing an action (e.g., corresponding with labels, logic, or output). Tokenizing circuit 116 may search for corresponding actions in different languages and may identify the corresponding tokens that can be equivalent (e.g., in performing the same action) across different languages.

Tokenizing circuit 116 may also be configured to build up or encode tokenized code as an encoder. The output of the encoder may correspond with the sequence vector of tokenized code to perform an action (e.g., the logic in a language required to run a program, read a complete file, or other computer-based actions performed by machine-readable instructions). In some examples, tokenizing circuit 116, as part of the encoder, may create tokens for the state vector and the decoder. To convert from the first language to the second language, tokenizing circuit 116 may encode the first language as one or more tokens, pass the tokens to the state vector, and then decode the tokens in the second language. Illustrative examples of tokenizing are provided with FIGS. 10-11.

Vectorizing circuit 118 may be configured to generate a sequence vector of tokenized code. In some examples, vectorizing circuit 118 may implement a state vector or thought vector to determine the status or state of the source code or executed code (e.g., numerical columns that represent how each term relates to other terms). For example, each sequence vector may describe a particular logic that configures a computing device to perform the corresponding action.

Machine learning (ML) training engine 120 may train the ML model-based compiler on the pairs of text (e.g., source code, executable code or files, translated numerical file, and other formats of pairs of text), as described herein.

Machine learning (ML) training engine 120 may continue and add more complexity to the training process (e.g., in addition to the "hello world" code). For example, ML training engine 120 may systematically add compiler features. The additional compiler features may be added to the sample input codes in a random fashion. The ML model-based compiler may be trained and checked periodically to ensure accuracy between the input source code and output. In another example, ML training engine 120 may add open-source code to identify new source code and training examples.

Machine learning (ML) training engine 120 may determine a confidence value associated with the output of the ML model-based compiler. For example, the confidence value may identify correctness of matching the source code with an action that the source code is expected to perform. The confidence value may identify the likelihood that the input matches the output (e.g., the ML model-based compiler gets the right answer).

Once the ML model-based compiler has a very high confidence in generating executable code (e.g., a confidence value that exceeds a threshold value), the ML model may be optimized in accordance with one or more optimization parameters. For example, the optimization parameter may include increasing a speed of the execution. The sample code can be compiled and executed, and the time of execution may be recorded and used for optimization.

In another example, ML training engine 120 may recommend performance optimized source and executable code. In this example, a particular computing device may be identified as output of the trained ML model, where the particular computing device corresponds with the most efficient computing device for the source or compiled code. In this way, the execution of the compiled code may be optimized.

Machine learning (ML) production engine 122 may be trained to convert the input as pairs of text (e.g., the source code and corresponding numerical format) corresponding with a first programming language to output. ML production engine 122 may compile the computer source code from the first programming language to computer source code corresponding with a second programming language (e.g., converting C code to Fortran code or translate TensorFlow code into PyTorch code) or convert source code into a numerical format (as discussed throughout the disclosure).

In some examples, ML production engine 122 may receive the pairs of text as a sequence vector of tokenized code. ML production engine 122 may be trained to generate output that creates a second executable file for device X or device Y. In other words, ML production engine 122 may create an executable file corresponding with the source code that, once converted to the numerical format, performs the same operations in either device X or device Y.

ML production engine 122 may also convert the executable file to run on different computing devices (e.g., Intel® CPU, AMD® CPU, NVIDIA® GPU, AMD® GPU, TPU, and other processors).

ML production engine 122 may be configured to execute a supervised ML model using a linear or non-linear function. For example, the trained ML model may comprise a decision tree that accepts the one or more input features associated with the source code or executable code to provide a confidence score correlating the input to an output (e.g., the source code in a different language, the executable code for a different device, and other conversion processes described herein).

In some examples, when a nonlinear ML model is used, the weightings of tokens corresponding with portions of the source code or executable code may vary. In some examples, the weight may be decided through an iterative training process for the ML model-based compiler.

In some examples, the ML model-based compiler may comprise a neural network that measures the relationship between the dependent variable (e.g., logic or action implemented by the device) and independent variables (e.g., the token) by using multiple layers of processing elements that ascertain non-linear relationships and interactions between the independent variables and the dependent variable.

In some examples, the ML model-based compiler may comprise a Deep Learning Neural Network that consists of more than one layer of processing elements between the input layer and the output later, or a Convolutional Neural Network, in which successive layers of processing elements contain particular hierarchical patterns of connections with the previous layer.

Hardware module 124 may determine one or more computing devices that may execute the compiled, executable code. The computing device identified may be based on characteristics of the computing device. Identification of the computing device, instruction set architecture (ISA) of the device, and other information may be stored in hardware devices data store 134.

In some examples, hardware module 124 may identify a particular computing device that is optimized to pass data from a first computing device to a second computing device along a network path. Hardware module 124 may identify the particular computing device based on the characteristics and convert the compiled, executable code to run on that particular computing device. In another example, hardware module 124 may automatically distribute workloads on the most available performant processor or accelerator component of the computing device (e.g., in support of the performance-as-a-service business model).

Hardware module 124 may also determine temporary characteristics of one or more computing devices that may be candidates to execute the compiled, executable code. The temporary characteristics of the computing devices may also be stored in hardware devices data store 134 to analyze the data over time. For example, at a first time period, a first computing device may execute instructions a fifty percent capacity and a second computing device may execute instructions at ninety percent capacity. Hardware module 124 may convert the source code to be executed by the first computing device that has computing capacity to run additional processes. The first computing device may be underutilized or standing by for the instructions to execute, and after being identified, may execute the instructions so that it is no longer underutilized.

In some examples, computing device 100 may be implemented to run as a service, where entities that call computing device 100 may have hundreds of models to deploy in a production environment. A first portion of the models may run more efficiently at a first computing device than a second device (e.g., 20% of the models work well on a first computing architecture) and a second portion of the models may run more efficiently at a second computing device than the first device (e.g., 20% of the models work well on a second computing architecture). A computer programmer or software developer can write the initial source code in a first language and computing device 100 can convert the source code or compiled, executable code to execute on any computing device that is optimized for speed, efficiency, availability, and the like.

Optimization module 126 may receive performance data of various computing devices that execute compiled, executable code. The execution time, processing speed, or other metrics may be correlated to the compiled code and compared across various devices. The performance data may be used to train the ML model-based compiler to identify the hardware computing device that should receive the instructions to execute for a particular process in order to optimize for execution.

In some examples, optimization module 126 may combine or aggregate tokens to generate succinct source code or executable code. For example, a first English to French translator may convert a phrase in English from 10 words to 20 French words whereas a second English to French translator may convert phrase in English from 10 words to 8 French words. Both of these French phrases may convey a similar English sentence, yet the second translator may convert the sentence more succinctly (e.g., fewer words, fewer characters, simpler terms, or other optimization goals). Similarly, the ML model-based compiler may combine or aggregate tokens that perform an executable process (e.g., opening, processing, and storing a novel in a data store) into fewer steps (or other optimization parameters) than a standard compiler in order to optimize for execution.

Figure 2:
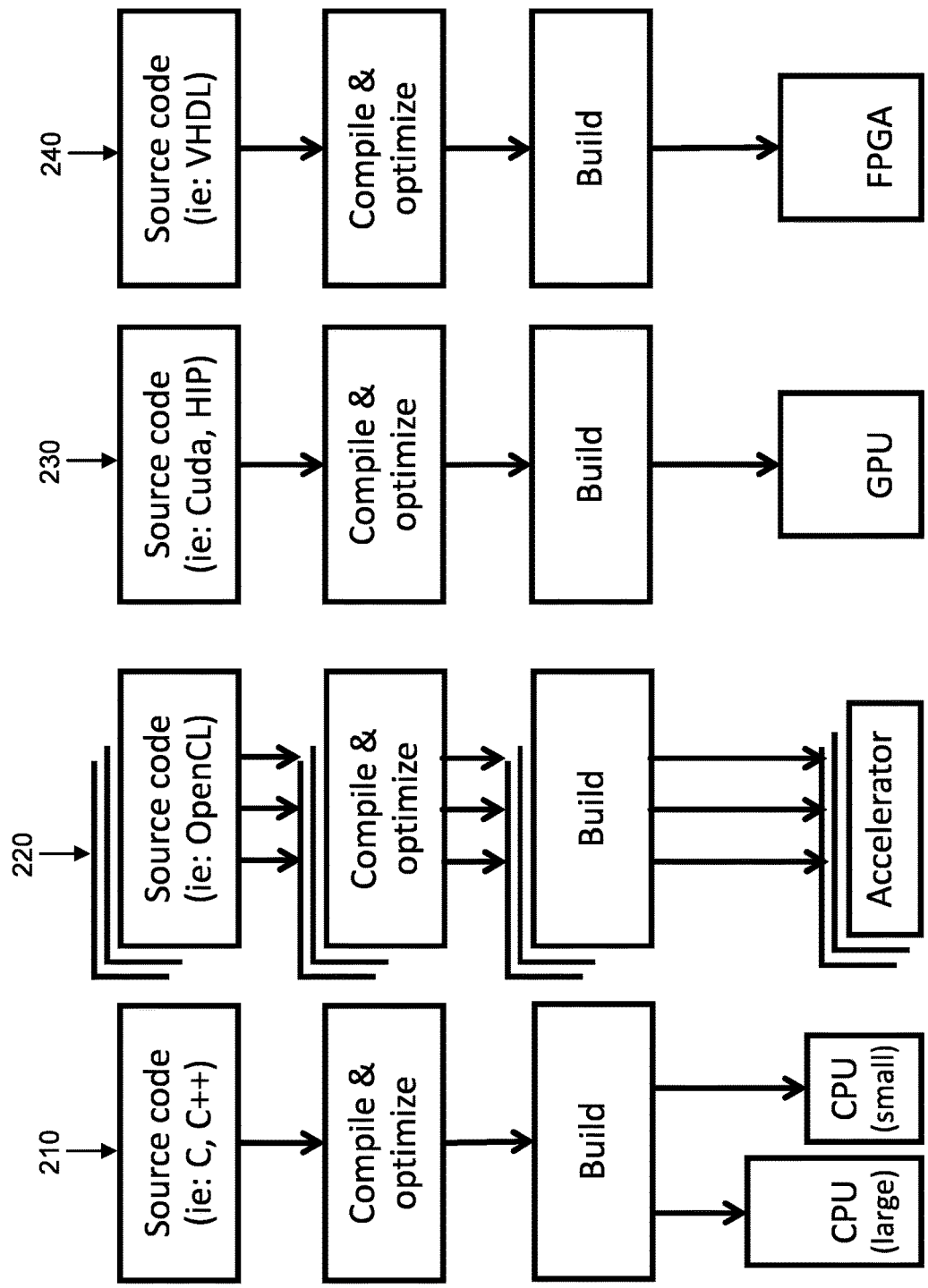
FIG. 2 illustrates standard, local, or native compilers.

FIG. 2 illustrates a traditional set of compilers. In example 210, a first source code language (C or C++) can be compiled and optimized using a first compiler, then built into executable code that runs on one or more computing devices with one or more central processing units (CPUs). In example 220, a first source code language using the (OpenCL) framework can be compiled and optimized using a second compiler, then built into an executable code that runs on one or more computing devices with one or more accelerators. In example 230, a first source code language using the (CUDA or HIP) toolkit can be compiled and optimized using a third compiler, then built into executable code that runs on one or more computing devices with one or more graphics processing units (GPUs). In example 240, a first source code language (VHDL) can be synthesized/compiled and optimized using a fourth compiler, then built into executable code that runs on one or more computing devices with one or more Field Programmable Gate Arrays (FPGA).

Each of the illustrated examples includes a different compiler or other computer program that is tuned to receive a source code programming language and change it into another format that runs on a particular device (e.g., built into executable code that runs on the particular computing device). The compiler may translate the computer code written in one programming language (e.g., the source language) into another language (e.g., assembly language, object code, machine code, or other the target language) to create an executable program.

FIGS. 3-6 illustrate computing devices for implementing a ML model-based compiler, in accordance with some examples of the disclosure. In these examples, the initial code (e.g., source code, machine executable code, or other code) may pass through an encoding process that generates embedded tokens. The embedded tokens may be transmitted to the state vector that converts them into other architectures or formats and transmits them to the decoding process. The decoding process can build up the tokens or sequence vectors of numerical codes into various defined formats (e.g., different source code, machine executable code, or other code).

Figure 3:
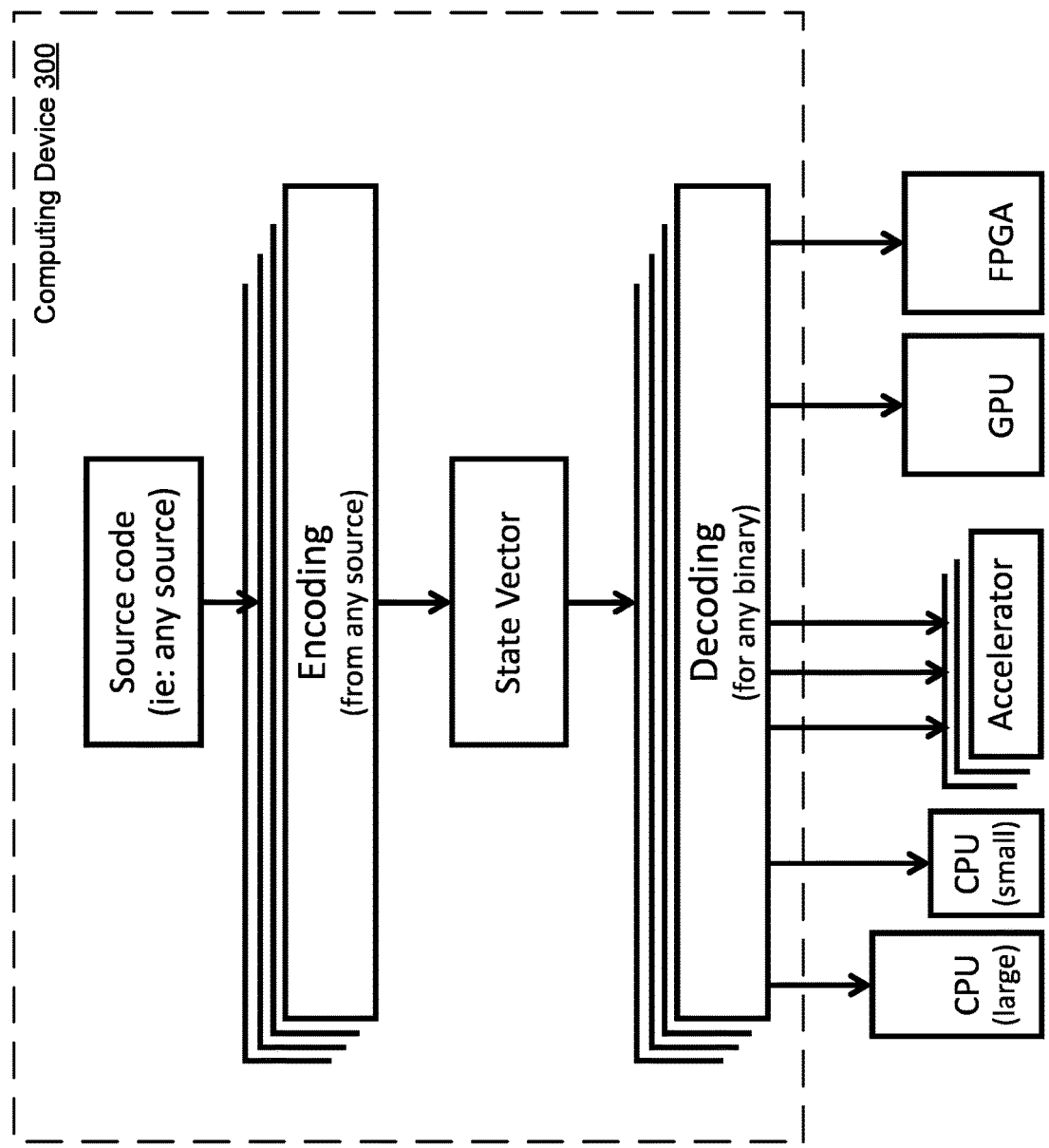
FIGS. 3-6 illustrate computing devices for implementing a ML model-based compiler, in accordance with some examples of the disclosure.

FIG. 3 illustrates a computing device that implements the ML model-based compiler, in accordance with some examples of the disclosure. Computing device 300 of FIG. 3 may implement several components illustrated with computing device 100 illustrated in FIG. 1, which have been removed for simplicity of illustration. In this example, computing device 300 may receive any source code programming language and change it from a first format to a second format (e.g., using an encoding and decoding process) that is configured to run on multiple devices (e.g., source code A into executable file for device X or device Y) using the ML model-based compiler.

Figure 4:
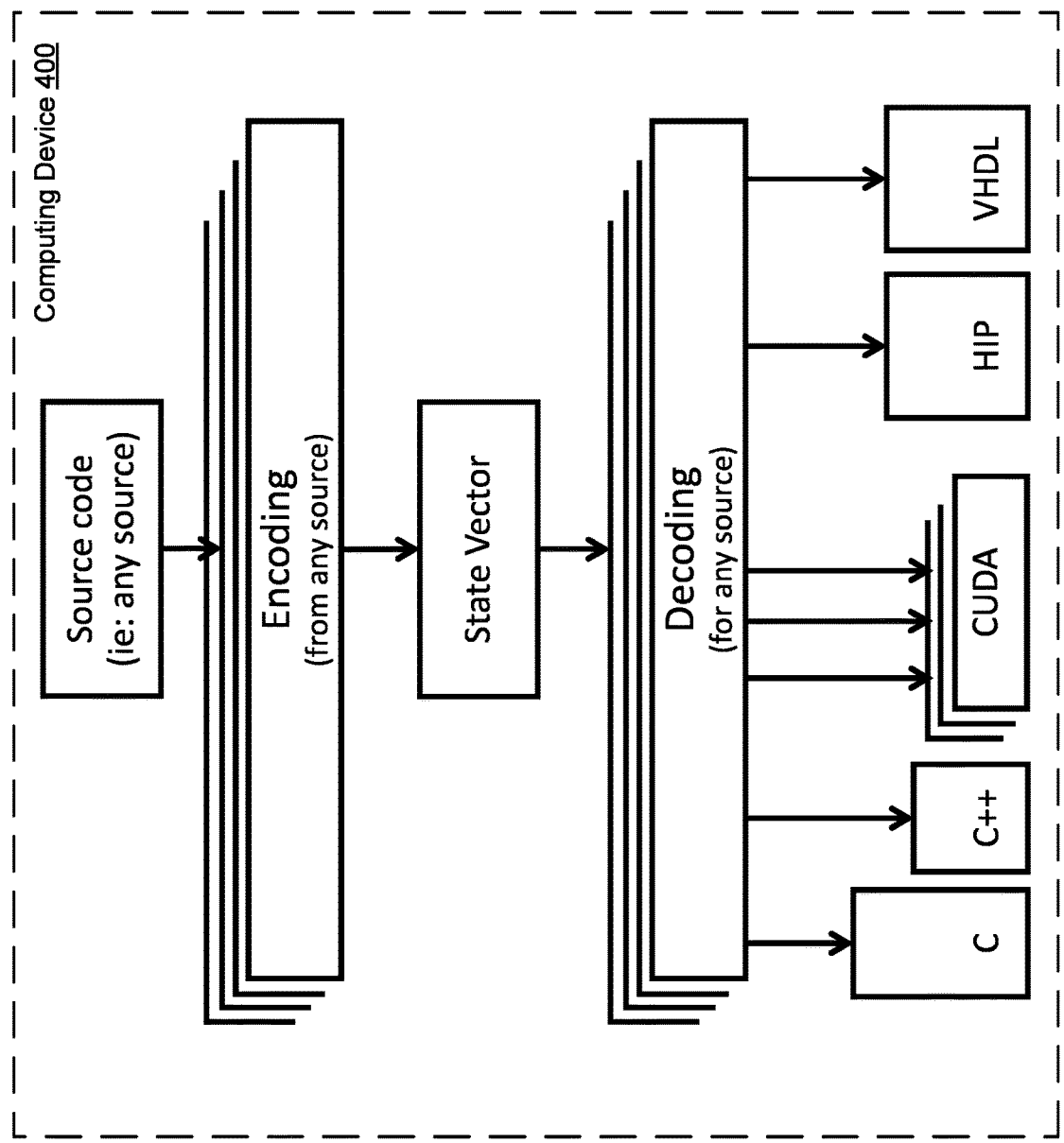

FIG. 4 illustrates a computing device that implements the ML model-based compiler, in accordance with some examples of the disclosure. Computing device 400 of FIG. 4 may implement several components illustrated with computing device 100 illustrated in FIG. 1, which have been removed for simplicity of illustration. In this example, computing device 400 may receive any source code programming language and change it from a first format to a second format that corresponds with any other source code programming language (e.g., source code A into source code B or source code C) using the ML model-based compiler.

Figure 5:
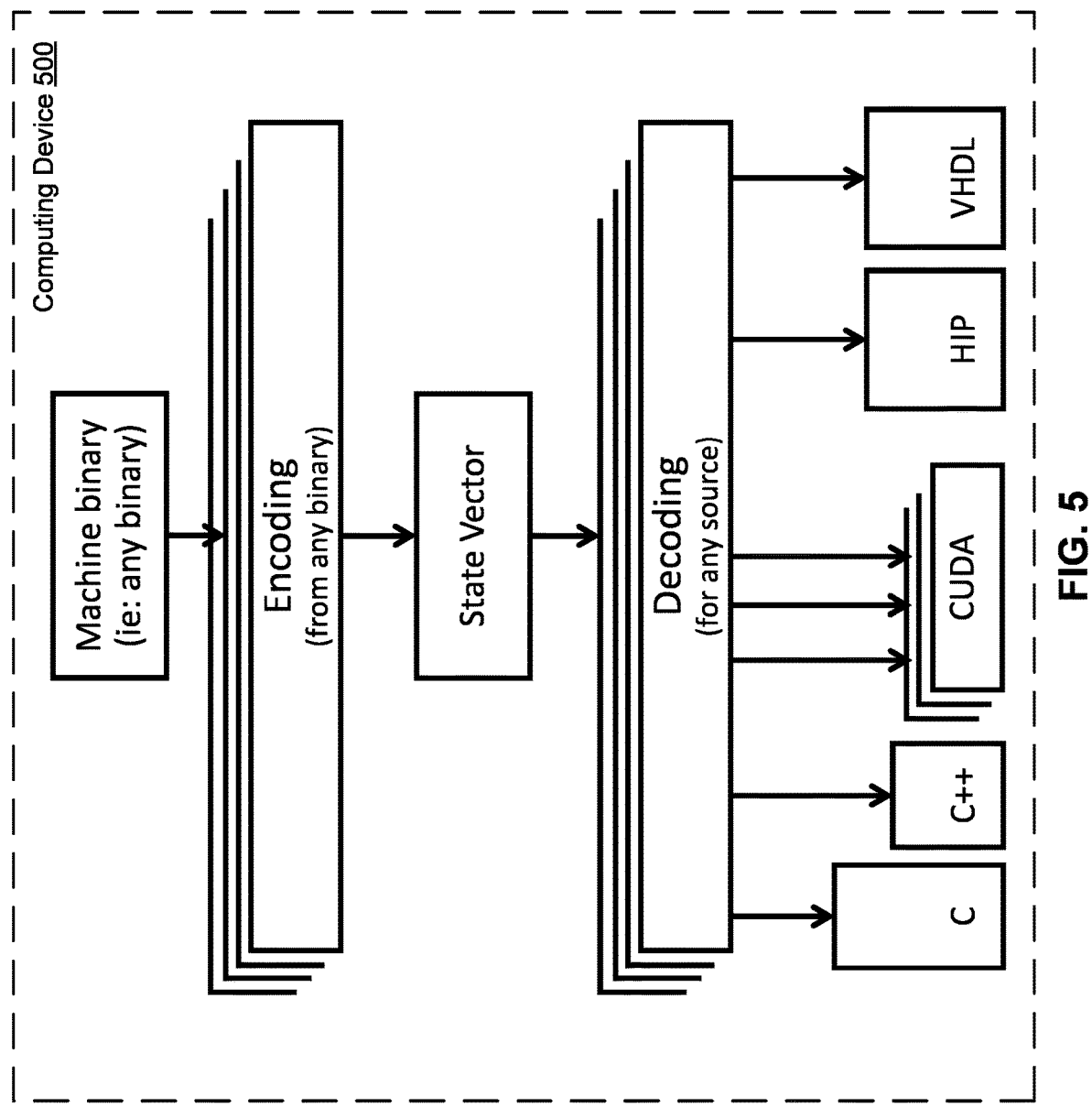

FIG. 5 illustrates a computing device that implements the ML model-based compiler, in accordance with some examples of the disclosure. Computing device 500 of FIG. 5 may implement several components illustrated with computing device 100 illustrated in FIG. 1, which have been removed for simplicity of illustration. In this example, computing device 500 may receive executable code and change it from a first format to a second format that corresponds with any source code programming language (e.g., executable for device X into source code A or source code B) using the ML model-based compiler.

Figure 6:
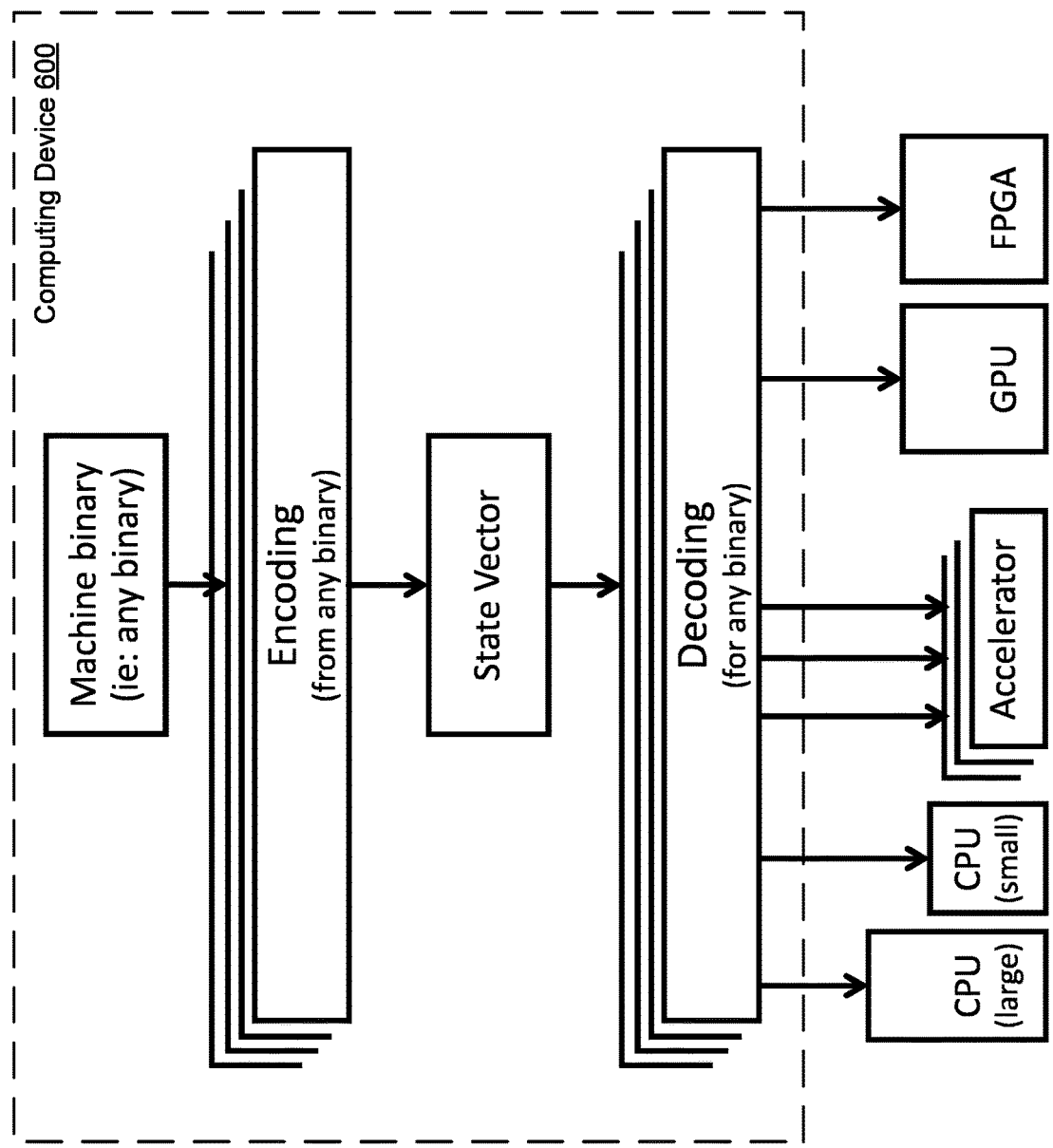

FIG. 6 illustrates a computing device that implements the ML model-based compiler, in accordance with some examples of the disclosure. Computing device 600 of FIG. 6 may implement several components illustrated with computing device 100 illustrated in FIG. 1, which have been removed for simplicity of illustration. In this example, computing device 600 may receive executable code that is configured to run on a first device and change it from a first format to a second format that is configured to run on a different device (e.g., executable file for device X into executable file for device Y) using the ML model-based compiler.

Figure 7:
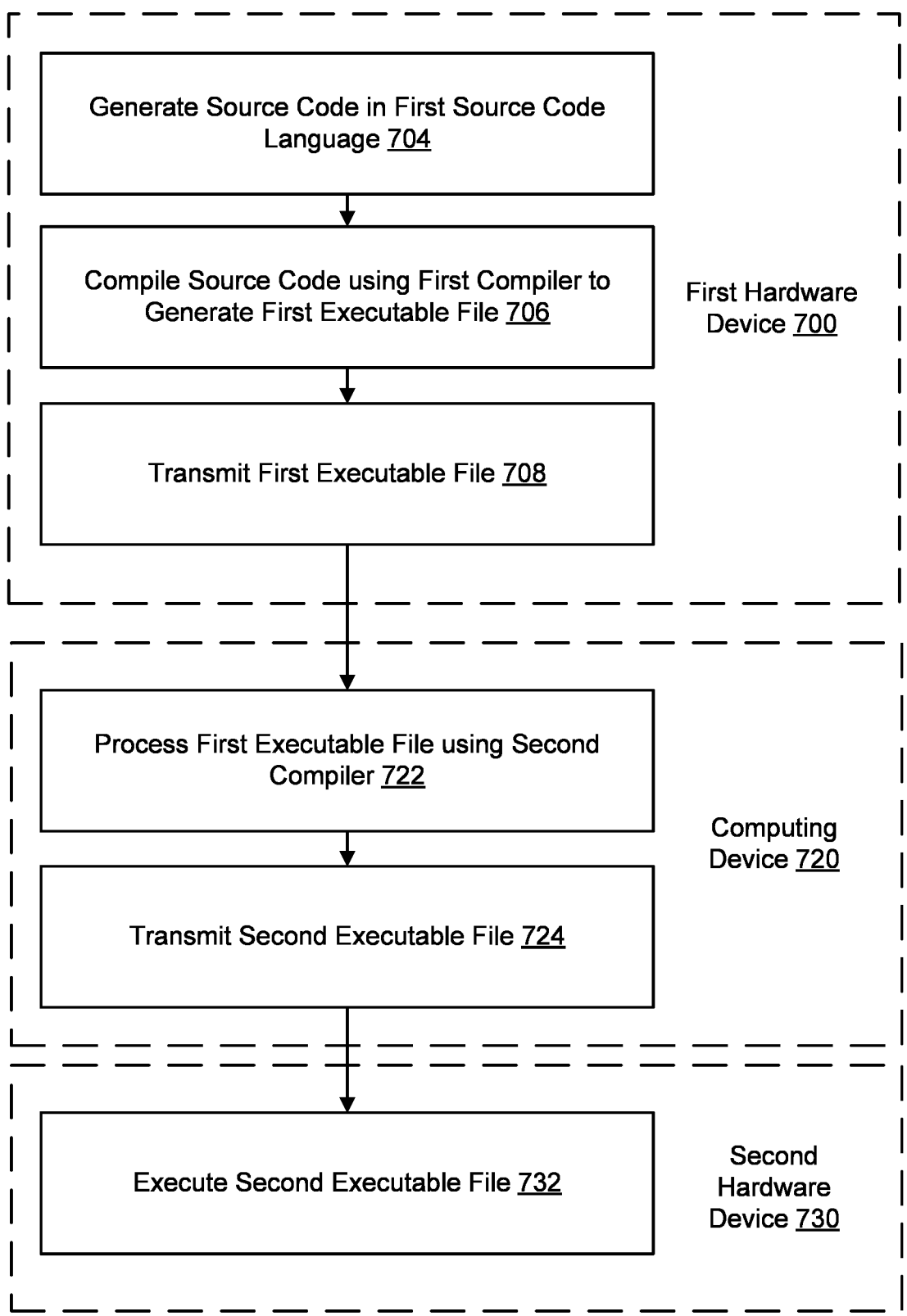
FIG. 7 illustrates cross compiling source code for different computing devices, in accordance with some examples of the disclosure.

FIG. 7 illustrates cross compiling source code for different computing devices, in accordance with some examples of the disclosure. As illustrated throughout the application, the source code and executable code may be compiled locally or natively at computing device 100 illustrated in FIG. 1 or may be compiled locally or natively at a first computing device and transmitted to computing device 100 to convert to another format (e.g., for cross compiling the code).

In some examples, first hardware device 700 may correspond with computing device 100 illustrated in FIG. 1. First hardware device 700 can generate source code and convert the source code to an executable file that is enabled to run on a second device, as illustrated with second hardware device 730. As such, first hardware device 700 may implement cross compiling by instructing the ML based compiler located at first hardware device 700 that the executable file will be run on second hardware device 730 (e.g., corresponding with a particular instruction set architecture (ISA) or other computing component). The ML based compiler at first hardware device 700 may fully generate the executable file in a numerical format on the first hardware but cannot run the executable file on first hardware device 700.

Once the executable file is generated, the file may be transmitted. For example, first hardware device 700 can transmit the executable file in the numerical format directly to second hardware device 730, as illustrated in FIGS. 5 and 6. In other examples, first hardware device 700 can transmit the executable file in the numerical format through an intermediary device, like computing device 720, to run the executable file in a numerical format to run at second hardware device 730.

When an intermediary device is implemented, first hardware device 700 may implement a local compiler (for generating a standard executable file from source code) and the intermediary device implements the ML based compiler (for converting the source code or executable file originated by first hardware device 700 to a different format, as discussed herein). For example, computing device 100 illustrated in FIG. 1 may correspond with computing device 720 and local computing devices (e.g., operated by computer programmers or software developers) may correspond with the first hardware device 700 and the second hardware device 730. In this example, computing device 720 does not generate the original source code file or run the executable file, but may analyze the source code file (generated by first hardware device 700) to generate the executable file for a different device (second hardware device 730). In some examples, first hardware device 700 and the second hardware device 730 may implement a standard or local compiler while computing device 720 may implement the trained ML model-based compiler. Although, various implementations are possible and this illustrates one example.

At block 704, first hardware device 700 may generate source code in a first source code language.

At block 706, first hardware device 700 may compile the source code using a first compiler to generate the executable file for second hardware device 730. The first compiler may correspond with a standard or local compiler configured to compile the source code.

At block 708, first hardware device 700 may transmit the first executable file to computing device 720.

At block 722, computing device 720 may process the first executable file using a second compiler, where the second compiler corresponds with the trained ML model-based compiler. In some examples, the first executable file may be processed using the trained ML model-based compiler in order to convert the first executable file into a second executable file. The second executable file may be output from the trained ML model-based compiler.

At block 724, computing device 720 may transmit the second executable file to second hardware device 730.

When first hardware device 700 generates the executable file for second hardware device 730 and transmits the executable file directly to second hardware device 730, blocks 722 and 724 may be optional.

At block 732, second hardware device 730 may execute the second executable file.

Figure 8:
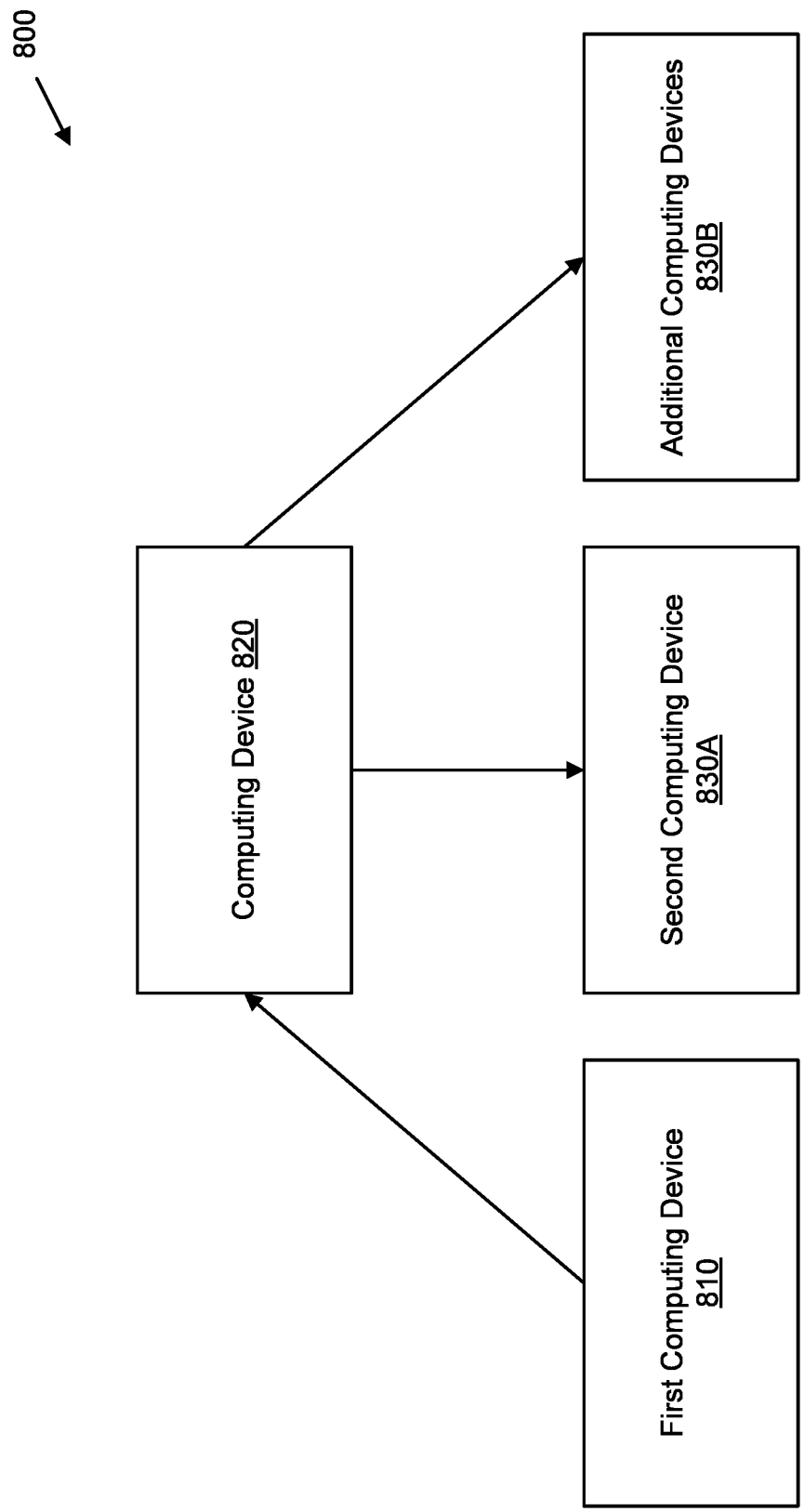
FIG. 8 illustrates cross compiling source code for different computing devices, in accordance with some examples of the disclosure.

FIG. 8 illustrates cross compiling source code for different computing devices, in accordance with some examples of the disclosure. For example, computing device 100 illustrated in FIG. 1 may correspond with computing device 820 and local computing devices (e.g., operated by computer programmers or software developers) may correspond with the first computing device 810, second computing device 830A, and additional computing devices 830B. In some examples, these local computing devices may implement a standard compiler while computing device 820 implementing the trained ML model-based compiler.

A similar process to the process implemented in FIG. 7 may be implemented in FIG. 8, yet the output of computing device 820 may generate an executable file configured to run on computing devices that operate a different instruction set architecture (ISA) than first computing device 810.

Figure 9:
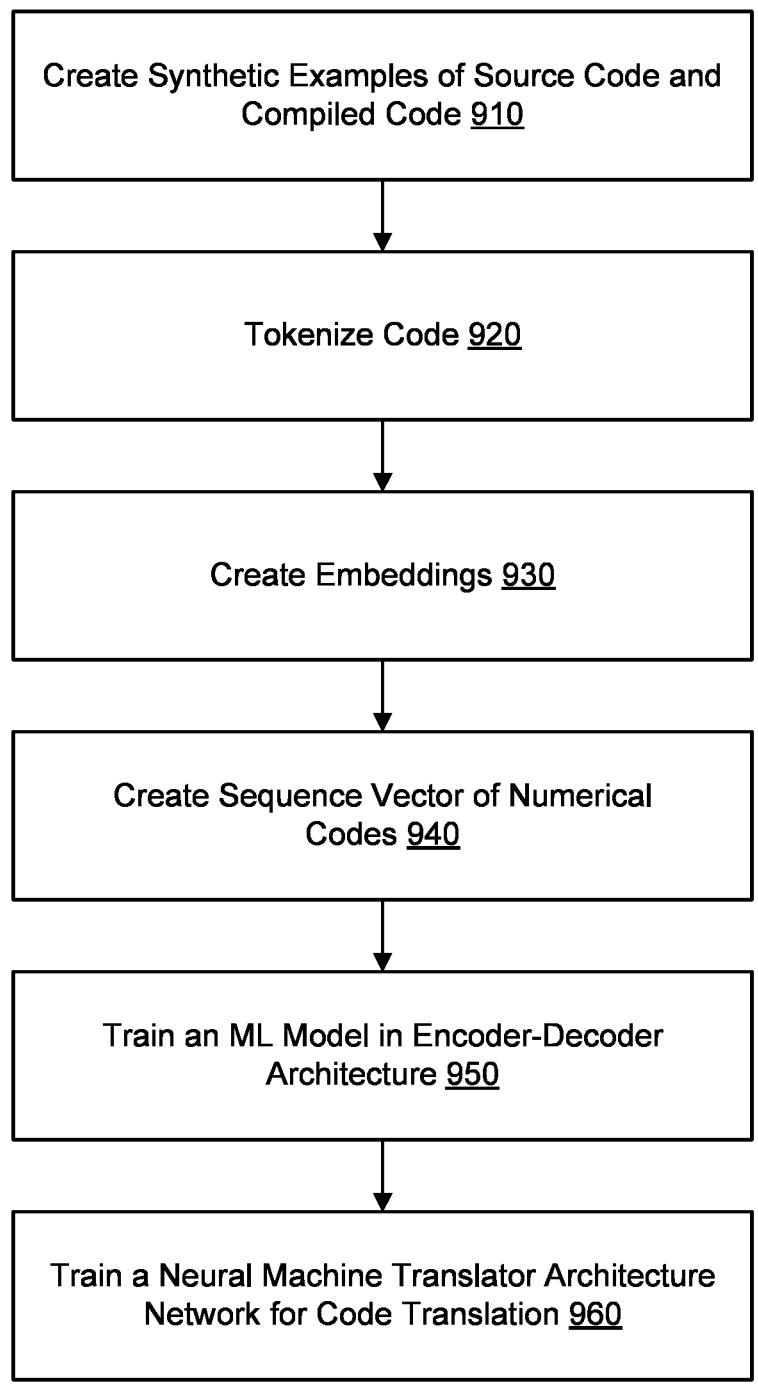
FIG. 9 illustrates a process for training the ML model-based compiler, in accordance with some examples of the disclosure.

FIG. 9 illustrates a process for training the ML model-based compiler, in accordance with some examples of the disclosure. For example, computing device 100 illustrated in FIG. 1 may receive source code or compiled, executable code to help train the ML model-based compiler.

At block 910, the process may create synthetic examples of source code and compiled, executable code. For example, the process may run scripts to generate the synthetic examples or may initiate a web crawler to gather source code examples from various sources, including open source data. The source code may be compiled using a standard compiler associated with the programming language of the source code to generate a compiled, executable code. In other examples, the process may receive source code examples and compiled, executable files.

At block 920, the process may tokenize the source code and compiled code into one or more tokens as part of the training process. The tokens may be stored in a token data store like tokenized code data store 132.

At block 930, the process may create embeddings. For example, the embedding process may translate high-dimensional vectors in a low-dimensional space in order to simplify the machine learning process. The embeddings may include some of the semantics of the language corresponding with the input (e.g., source or executable code) by placing semantically similar inputs or predicted outputs close together in the embedding space (e.g., the sentences "How old are you?" and "What is your age?" may generate similar outputs in a language conversion example, and "X=A+B+C" may be the same as "X=B+A+C" in a coding example). In some examples, the embeddings can be learned and reused across different ML models (e.g., source code in a first language to source code in a second language, source code on a first device to executable code on a second device, etc.).

At block 940, the process may create a sequence vector of numerical (e.g., binary, hexadecimal, or octal) codes.

At block 950, the process may train a ML model in an encoder-decoder architecture. In some examples, the model may correspond with one or more machine learning models, including a generative adversarial network (GAN) model. The GAN model may correspond with a particular type of ML model in which two neural networks compete with each other to become more accurate in their predictions. Other types of ML models are available as well as discussed herein, including a Deep Learning Neural Network or a Convolutional Neural Network.

At block 960, the process may train a neural machine translator architecture network for code translation. Once the ML model is trained, the ML model based compiler is generated from the training process.

Figure 10:
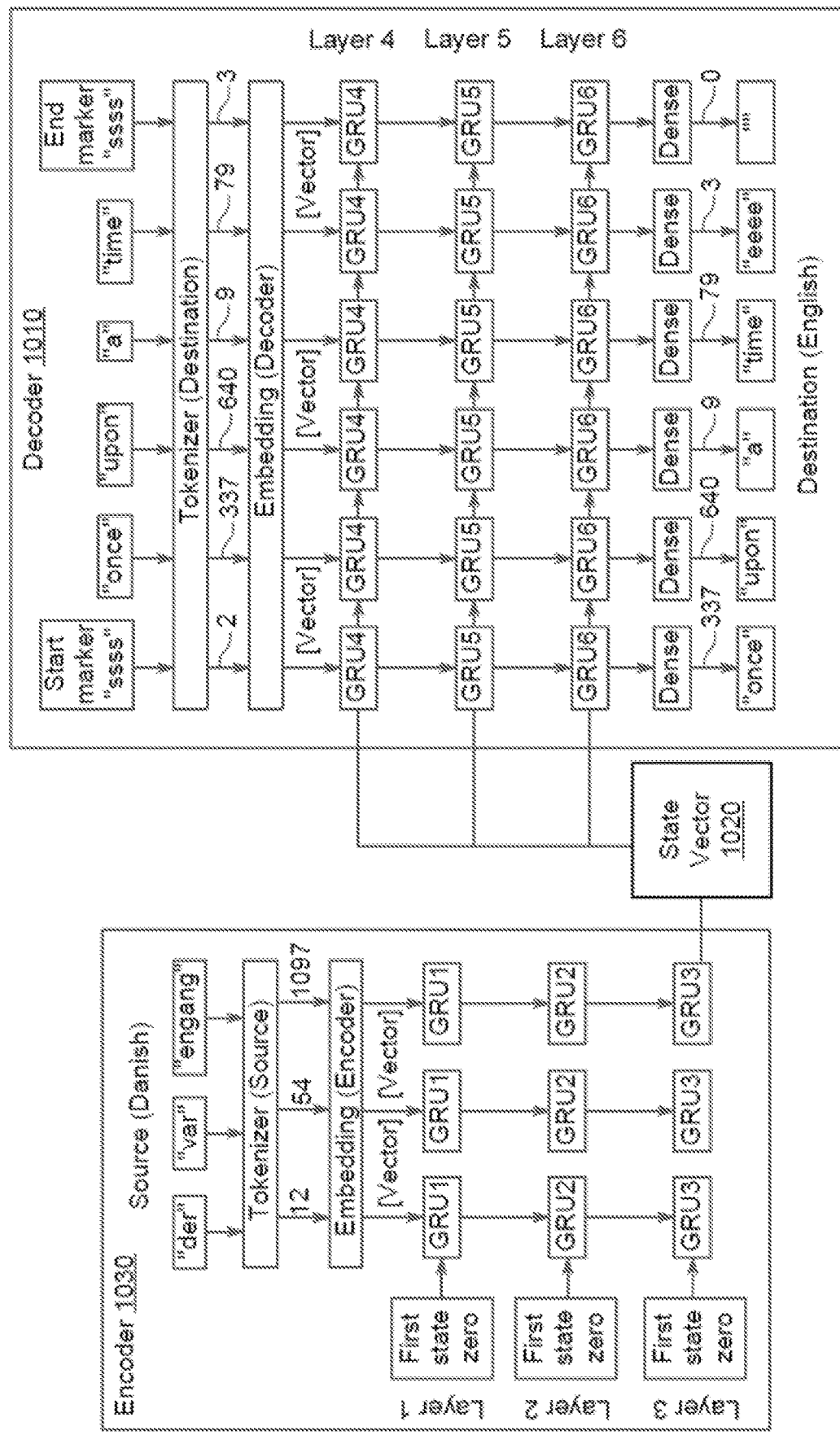
FIG. 10 illustrates a process for tokenizing and embedding a source language to a destination language, in accordance with some examples of the disclosure.

FIG. 10 illustrates a process for tokenizing and embedding a source language to a destination language, in accordance with some examples of the disclosure. In this illustrative example, decoder 1010 may receive a sentence of terms that is tokenized and embedded. The embedded tokens may be transmitted to the state vector 1020. State vector 1020 can transmit the embedded tokens to encoder 1030 to convert them into other architectures or formats using the encoder process, which can build up the tokens or sequence vectors of numerical codes into these defined formats (e.g., English to Danish languages).

Figure 11:
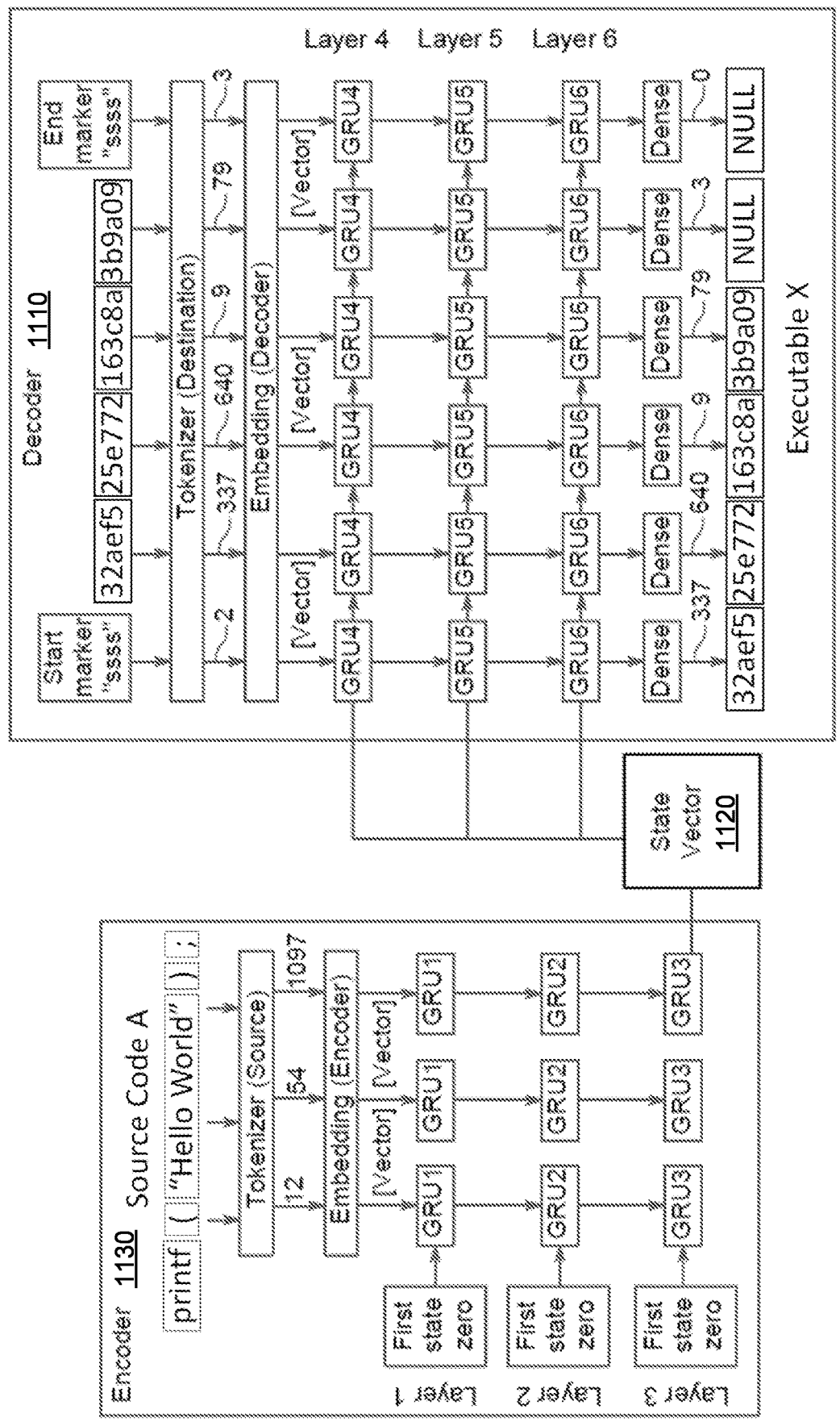
FIG. 11 illustrates a process for tokenizing and embedding source code for compiling, in accordance with some examples of the disclosure.

FIG. 11 illustrates a process for tokenizing and embedding source code for compiling, in accordance with some examples of the disclosure. In this illustrative example, decoder 1110 may receive a set of terms that is tokenized and embedded. The embedded tokens may be transmitted to the state vector 1120. State vector 1120 can transmit the embedded tokens to encoder 1130 to convert them into other architectures or formats using the encoder process, which can build up the tokens or sequence vectors of numerical codes into these defined formats (e.g., source code A to executable X).

Figure 12:
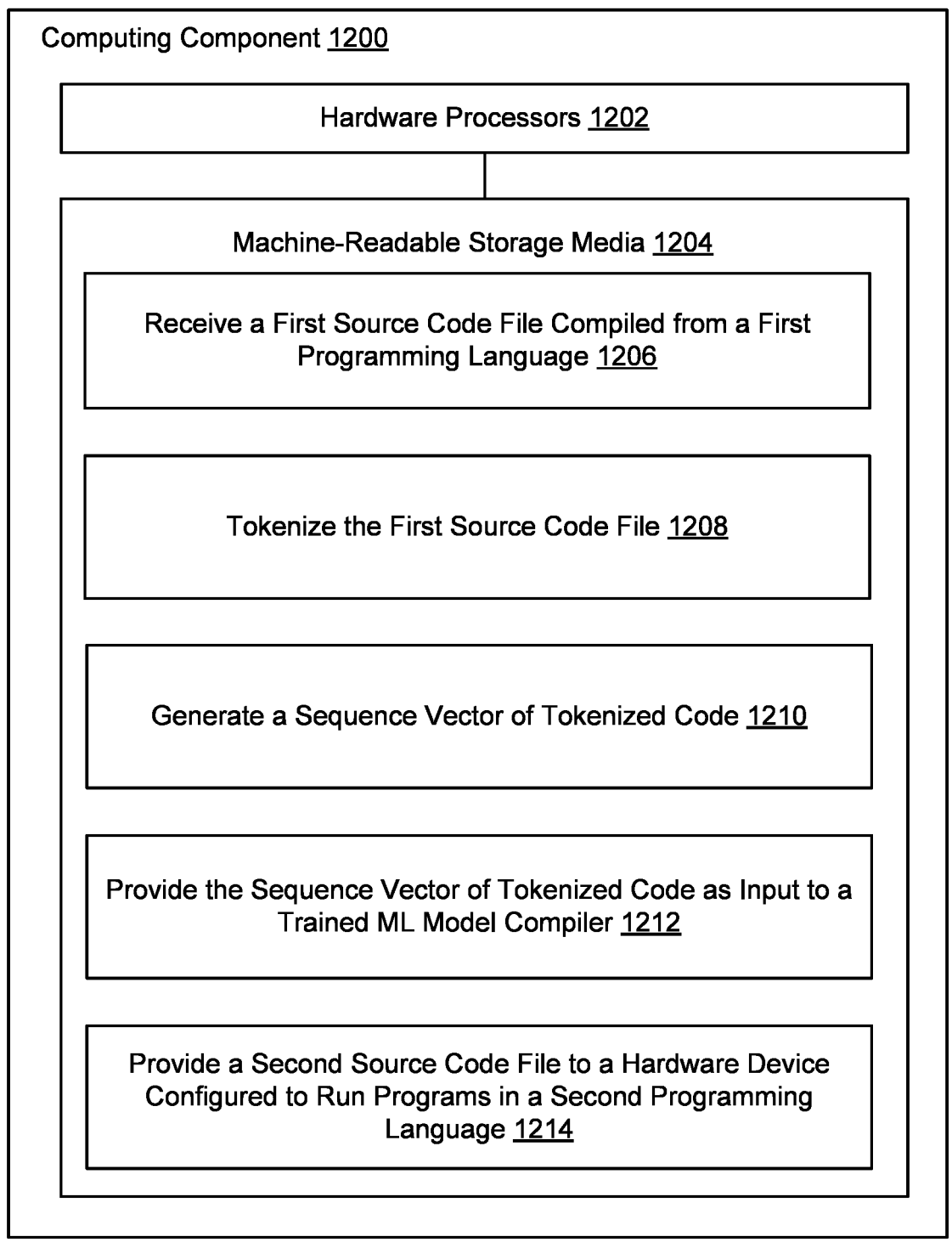
FIG. 12 is an example computing component that may be used to implement various features of embodiments described in the present disclosure.

FIG. 12 illustrates an example computing component that may be used to implement a ML model-based compiler in accordance with various embodiments. Referring now to FIG. 12, computing component 1200 may be, for example, a server computer, a controller, or any other similar computing component capable of processing data. In the example implementation of FIG. 12, the computing component 1200 includes a hardware processor 1202, and machine-readable storage medium for 1204.

Hardware processor 1202 may be one or more central processing units (CPUs), semiconductor-based microprocessors, and/or other hardware devices suitable for retrieval and execution of instructions stored in machine-readable storage medium 1204. Hardware processor 1202 may fetch, decode, and execute instructions, such as instructions 1206-1212, to control processes or operations for implementing a ML model-based compiler. As an alternative or in addition to retrieving and executing instructions, hardware processor 1202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1204, may be any electronic, magnetic, optical, or other physical storage device that contains or stores executable instructions. Thus, machine-readable storage medium 1204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1204 may be a non-transitory storage medium, where the term "non-transitory" does not encompass transitory propagating signals. As described in detail below, machine-readable storage medium 1204 may be encoded with executable instructions, for example, instructions 1206-1212.

Hardware processor 1202 may execute instruction 1206 to receive a first executable file compiled from a first programming language.

Hardware processor 1202 may execute instruction 1208 to tokenize the first executable file.

Hardware processor 1202 may execute instruction 1210 to generate a sequence vector of tokenized code.

Hardware processor 1202 may execute instruction 1212 to provide the sequence vector of tokenized code as input to a trained ML model compiler.

Hardware processor 1202 may execute instruction 1214 to provide a second executable file to a hardware device configured to run programs in a second programming language.

Figure 13:
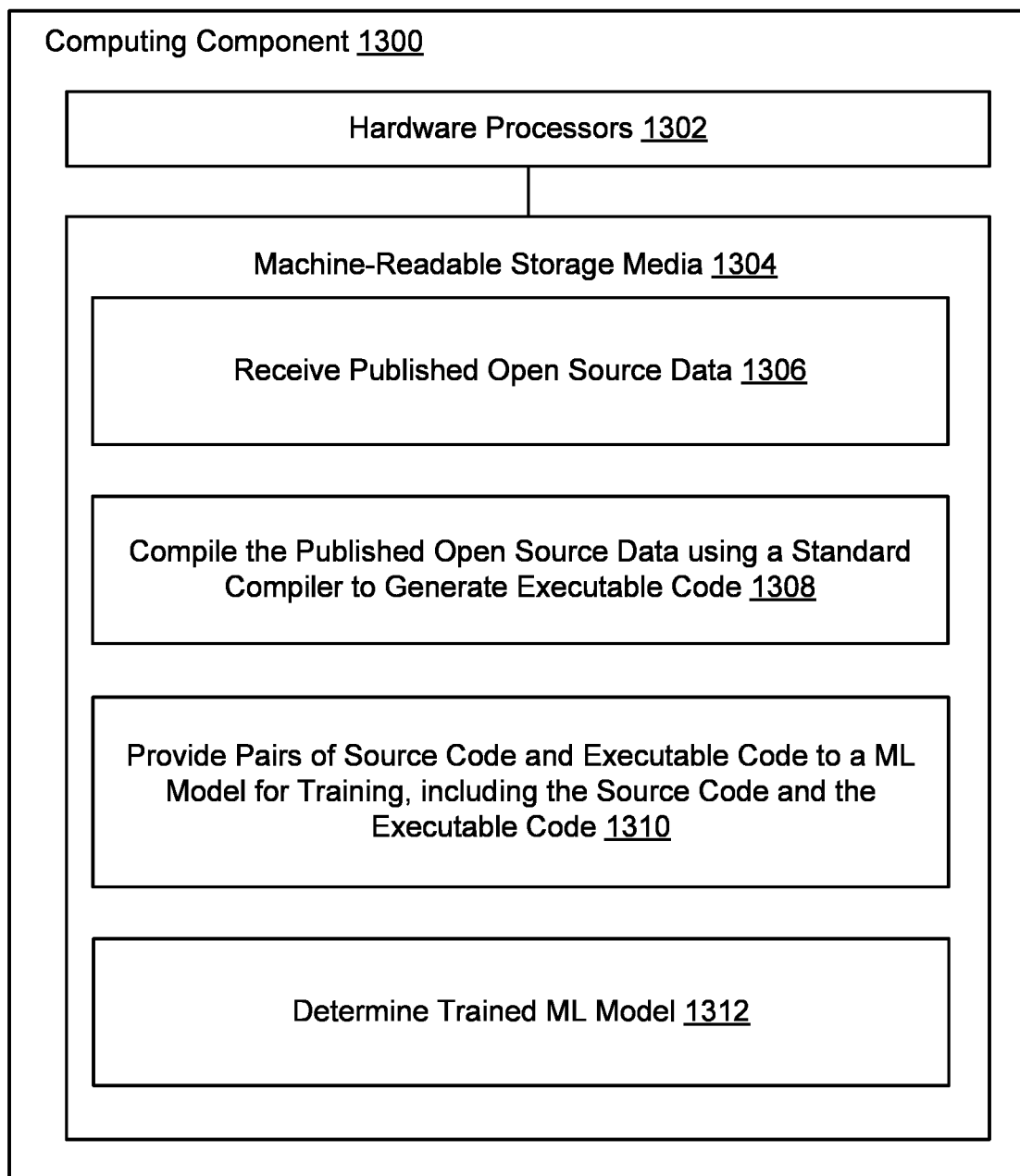
FIG. 13 is an example computing component that may be used to implement various features of embodiments described in the present disclosure.

FIG. 13 illustrates an example computing component that may be used to implement training of the ML model-based compiler in accordance with various embodiments. Referring now to FIG. 13, computing component 1300 may be, for example, a server computer, a controller, or any other similar computing component capable of processing data. In the example implementation of FIG. 13, the computing component 1300 includes a hardware processor 1302, and machine-readable storage medium for 1304.

Hardware processor 1302 may be one or more central processing units (CPUs), semiconductor-based microprocessors, and/or other hardware devices suitable for retrieval and execution of instructions stored in machine-readable storage medium 1304. Hardware processor 1302 may fetch, decode, and execute instructions, such as instructions 1306-1312, to control processes or operations for implementing a ML model-based compiler. As an alternative or in addition to retrieving and executing instructions, hardware processor 1302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1304, may be any electronic, magnetic, optical, or other physical storage device that contains or stores executable instructions. Thus, machine-readable storage medium 1304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1304 may be a non-transitory storage medium, where the term "non-transitory" does not encompass transitory propagating signals. As described in detail below, machine-readable storage medium 1304 may be encoded with executable instructions, for example, instructions 1306-1312.

Hardware processor 1302 may execute instruction 1306 to receive published open source data.

Hardware processor 1302 may execute instruction 1308 to compile the published open source data using a standard compiler to generate executable code.

Hardware processor 1302 may execute instruction 1310 to provide pairs of source code and executable code to an ML model for training, including the source code and executable code.

Hardware processor 1302 may execute instruction 1312 to determine the trained ML model.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances or making or achieving performance better than that which can be achieved with other settings or parameters.

Figure 14:
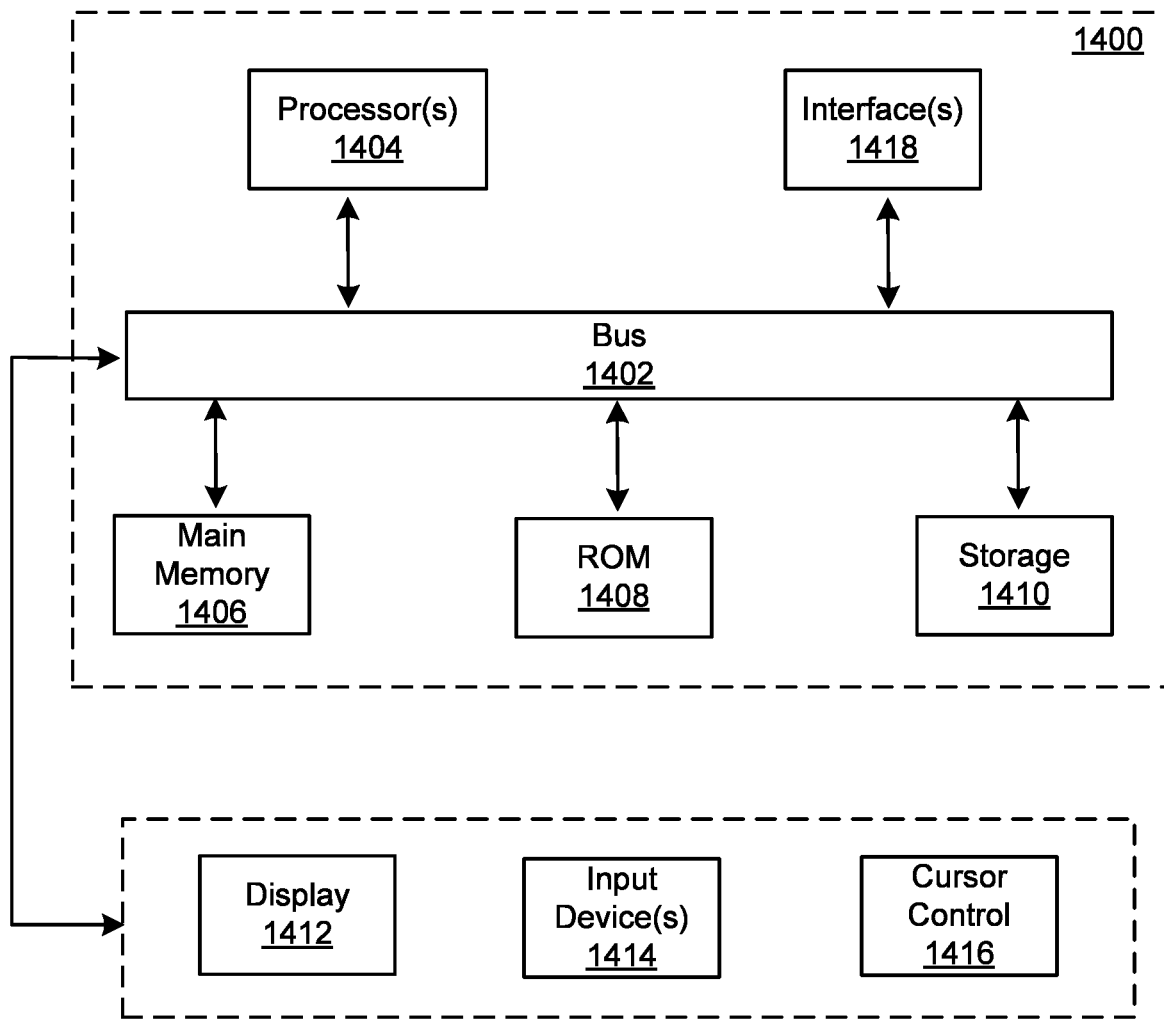
FIG. 14 depicts a block diagram of an example computer system in which various of the embodiments described herein may be implemented.

FIG. 14 depicts a block diagram of an example computer system 1400 in which various of the embodiments described herein may be implemented. The computer system 1400 includes a bus 1402 or other communication mechanism for communicating information, one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to a display 1412, such as a liquid crystal display (LCD) (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. In some embodiments, the same direction information and command selections as cursor control may be implemented via receiving touches on a touch screen without a cursor.

The computing system 1400 may include a user interface module to implement a graphical user interface (GUI) that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Python, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, NVMe drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

The computer system 1400 also includes a communication interface 1418 coupled to bus 1402. Communication interface 1418 provides a two-way data communication coupling to one or more network links that are connected to one or more local networks. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN (or wide area network (WAN) component to communicated with a WAN). Wireless links may also be implemented. In any such implementation, communication interface 1418 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local networks and the Internet both use electrical, electromagnetic or optical signals that carry digital data streams. The signals through the various networks and the signals on network link and through communication interface 1418, which carry the digital data to and from computer system 1400, are example forms of transmission media.

The computer system 1400 can send messages and receive data, including program code, through the network(s), network link(s) and communication interface(s) 1418. In the Internet example, a server might transmit a requested code for an application program through the Internet, the ISP, the local network and the communication interface 1418.

The received code may be executed by processor 1404 as it is received, and/or stored in storage device 1410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing device comprising:
 a memory; and
 one or more processors that are configured to execute machine readable instructions stored in the memory for instructing the one or more processors to:
  receive a first source code file, wherein the first source code file is compiled in a first programming language, and a first executable file compiled from the first source code file is compiled using a first hardware device with a first instruction set architecture (ISA);
  tokenize the first source code file forming tokenized code;
  generate a sequence vector of tokenized code;
  provide the sequence vector of tokenized code as input to a trained machine learning (ML) model compiler, wherein output of the trained ML model compiler creates a second source code file in a second programming language; and
  provide the second source code file to a second hardware device configured to run programs in the second programming language or process compute units with a second instruction set architecture (ISA), wherein the first ISA and the second ISA are different architectures.

2. The computing device of claim 1, wherein the tokenized code is in a hexadecimal format.

3. The computing device of claim 1, wherein the tokenized code is in a binary format.

4. The computing device of claim 1, wherein the one or more processors that are further configured to:
 embed the tokenized code using an encoder of the computing device, wherein output of the encoder is the sequence vector of tokenized code.

5. The computing device of claim 1, wherein the first source code file is compiled targeting the second hardware device with the second ISA, and wherein the first ISA and the second ISA are different architectures.

6. A computing device comprising:
 a memory; and
 one or more processors that are configured to execute machine readable instructions stored in the memory for instructing the one or more processors to:
  receive a first executable file, wherein the first executable file is generated from a first source code file in a first programming language, and the first executable file is compiled using a first hardware device with a first instruction set architecture (ISA);
  tokenize the first executable file forming tokenized code;
  generate a sequence vector of tokenized code;
  provide the sequence vector of tokenized code as input to a trained machine learning (ML) model compiler, wherein output of the trained ML model compiler creates a second executable file in a second programming language; and
  provide the second executable file to a second hardware device configured to run programs in the second programming language or process compute units with a second instruction set architecture (ISA).

7. The computing device of claim 6, wherein the first source code file in the first programming language is different than a second source code file corresponding with the second executable file.

8. The computing device of claim 6, wherein the tokenized code is in a hexadecimal format.

9. The computing device of claim 6, wherein the tokenized code is in a binary format.

10. The computing device of claim 6, wherein the one or more processors that are further configured to:
 embed the tokenized code using an encoder of the computing device, wherein output of the encoder is the sequence vector of tokenized code.

11. The computing device of claim 6, wherein the first source code file is compiled targeting a second hardware device with a second instruction set architecture (ISA), and wherein the first ISA and the second ISA are different architectures.

12. A computing device comprising:
a memory; and
one or more processors that are configured to execute machine readable instructions stored in the memory for instructing the one or more processors to:
receive first executable code, wherein the first executable code is compiled from first source code in a first programming language and the first executable code is configured to operate compute units with a first instruction set architecture (ISA);
tokenize the first executable code forming tokenized code;
generate a sequence vector of tokenized code;
provide the sequence vector of tokenized code as input to a trained machine learning (ML) model compiler, wherein output of the trained ML model compiler creates second source code in a second programming language; and
provide the second source code to a hardware device configured to compile the second source code in the second programming language that is different than the first programming language.

13. The computing device of claim 12, wherein the tokenized code is in a hexadecimal format.

14. The computing device of claim 12, wherein the tokenized code is in a binary format.

15. The computing device of claim 12, wherein the one or more processors that are further configured to:
embed the tokenized code using an encoder of the computing device, wherein output of the encoder is the sequence vector of tokenized code.

16. The computing device of claim 12, wherein the first source code is compiled targeting a second hardware device with a second instruction set architecture (ISA), and wherein the first ISA and the second ISA are different architectures.

17. A computing device comprising:
a memory; and
one or more processors that are configured to execute machine readable instructions stored in the memory for instructing the one or more processors to:
receive an open source code file, wherein the open source code file is generated in a programming language, and wherein the open source code file is published;
compile the open source code file using a standard compiler to generate executable code;
provide pairs of source code and executable code to a machine learning (ML) model for training, wherein the pairs of source code and executable code include the open source code file and the executable code; and
determine a trained ML model that has been trained.

18. The computing device of claim 17, wherein output of the trained ML model creates an executable file for a second computing device.

19. The computing device of claim 18, wherein the executable code is provided to a second hardware device configured to run programs in a second programming language or process compute units with a second instruction set architecture (ISA).

20. The computing device of claim 17, wherein output of the trained ML model creates a source code file in a second programming language that is different than the programming language corresponding with the open source code file.

* * * * *